US012801472B2

(12) United States Patent
Medicherla et al.

(10) Patent No.: US 12,801,472 B2
(45) Date of Patent: Nov. 17, 2026

(54) SYSTEM CRASH EVENT BASED DIAGNOSTICS OF AN INFORMATION HANDLING SYSTEM

(71) Applicant: Dell Products L.P., Round Rock, TX (US)

(72) Inventors: Laxmi Lavanya Medicherla, Georgetown, TX (US); Ibrahim Sayyed, Georgetown, TX (US); Alan H. Abdelhalim, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/060,432

(22) Filed: Feb. 21, 2025

(65) Prior Publication Data

US 2026/0252428 A1 Aug. 27, 2026

(51) Int. Cl.
*G06F 11/07* (2006.01)

(52) U.S. Cl.
CPC ...... *G06F 11/0772* (2013.01); *G06F 11/0778* (2013.01); *G06F 11/079* (2013.01); *G06F 11/0793* (2013.01)

(58) Field of Classification Search
CPC ............. G06F 11/0772; G06F 11/0778; G06F 11/079; G06F 11/0793
USPC .................................... 714/48, 37, 38.11, 45
See application file for complete search history.

(56) References Cited

U.S. PATENT DOCUMENTS

| | | | | |
|---|---|---|---|---|
| 8,132,057 B2 * | 3/2012 | Jann | G06F 11/0712 | 714/38.1 |
| 2004/0163011 A1 * | 8/2004 | Shaw | H04L 69/40 | 714/25 |
| 2005/0204199 A1 * | 9/2005 | Harper | G06F 11/079 | 714/38.11 |
| 2013/0212425 A1 * | 8/2013 | Blaine | G06F 11/3648 | 714/6.1 |
| 2015/0331734 A1 * | 11/2015 | Joshi | G06F 11/079 | 714/33 |
| 2016/0232069 A1 * | 8/2016 | Thomley | G06F 11/263 | |
| 2019/0278651 A1 * | 9/2019 | Thornley | G06F 11/0787 | |

(Continued)

FOREIGN PATENT DOCUMENTS

| | | | |
|---|---|---|---|
| CN | 116414591 A * | 7/2023 | G06F 11/079 |

*Primary Examiner* — Chae M Ko
(74) *Attorney, Agent, or Firm* — McDermott Will & Schulte LLP

(57) ABSTRACT

Managing system crash event-based diagnostics of an IHS, including detecting a crash event of an OS of the IHS, and in response: capturing telemetry data of the IHS related to the crash event, including a particular bug check code associated with the crash event; accessing a diagnostic profile associated with the crash event, the diagnostic profile including, for each bug check code of bug check codes, diagnostic tests associated with the bug check code; identifying, from the diagnostic profile, a mapping from the particular bug check code to a particular diagnostic test; automatically executing the particular diagnostic test at a computing device of the IHS that is associated with the particular bug check code; determining whether the diagnostic test was successful at the computing device; determining that the diagnostic test failed at the computing device, and in response, performing, independent of user action, a corrective action at the computing device.

20 Claims, 3 Drawing Sheets

(56) References Cited

U.S. PATENT DOCUMENTS

| | | | | |
|---|---|---|---|---|
| 2021/0240561 | A1* | 8/2021 | Shah | G06F 11/0793 |
| 2024/0086288 | A1* | 3/2024 | Sayyed | G06F 11/0751 |

* cited by examiner

200

SYSTEM CRASH EVENT BASED DIAGNOSTICS OF AN INFORMATION HANDLING SYSTEM

BACKGROUND

Field of the Disclosure

The disclosure relates generally to an information handling system, and in particular, system crash event based diagnostics of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

System crash events, such as the Blue Screen of Death (BSOD), occur when a critical error causes the operating system of an information handling system to stop functioning. These crashes can be triggered by hardware failures, driver issues, or software conflicts. When a BSOD happens, the information handling system displays a blue screen with an error code, which can help diagnose the problem.

SUMMARY

Innovative aspects of the subject matter described in this specification may be embodied in a method of managing system crash event-based diagnostics of an information handling system, including: detecting a crash event of an operating system (OS) of the information handling system; in response to detecting the crash event: capturing telemetry data of the information handling system related to the crash event, including a particular bug check code associated with the crash event; accessing a diagnostic profile associated with the crash event, the diagnostic profile including, for each bug check code of a plurality of bug check codes, one or more diagnostic tests associated with the bug check code; identifying, from the diagnostic profile, a mapping from the particular bug check code to a particular diagnostic test; automatically executing the particular diagnostic test at a computing device of the information handling system that is associated with the particular bug check code; determining whether the diagnostic test was successful at the computing device; and determining that the diagnostic test failed at the computing device, and in response, performing, independent of user action, a corrective action at the computing device.

Other embodiments of these aspects include corresponding systems, apparatus, and computer programs, configured to perform the actions of the methods, encoded on computer storage devices.

These and other embodiments may each optionally include one or more of the following features. For instance, determining that the diagnostic test failed at the computing device, and in response, performing the corrective action at the computing device and updating the diagnostic profile to indicate such. Updating the diagnostic profile based on the telemetry data. Monitoring the information handling system for the crash event of the OS of the information handling system. The crash event is a Blue Screen of Death (BSOD) crash event. The corrective action includes uninstalling a driver associated with the computing device at the information handling system. The corrective action includes updating a driver associated with the computing device at the information handling system. The corrective action includes disabling a driver associated with the computing device at the information handling system. The corrective action includes updating firmware associated with the computing device at the information handling system. The corrective action includes updating a configuration associated with the computing device at the information handling system. Determining that the diagnostic test passed at the computing device, and in response: identifying, from the diagnostic profile, a further mapping from the particular bug check code to a further diagnostic test; executing the further diagnostic test at the computing device of the information handling system that is associated with the particular bug check code; and determining whether the further diagnostic test was successful at the computing device.

Particular implementations of the subject matter described in this specification can be implemented so as to realize one or more of the following advantages. For example, running quick, targeted diagnostics based on crash event bug check codes can effectively identify the root cause of issues and provide remediation; effective crash event monitoring and mitigation with telemetry data accelerates recovery and auto-healing, thereby enhancing the user experience; improving system stability, reducing the frequency of crash events, enhancing the ability to diagnose and address crashes events promptly, and proactively manage drivers and firmware to prevent future crash events.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
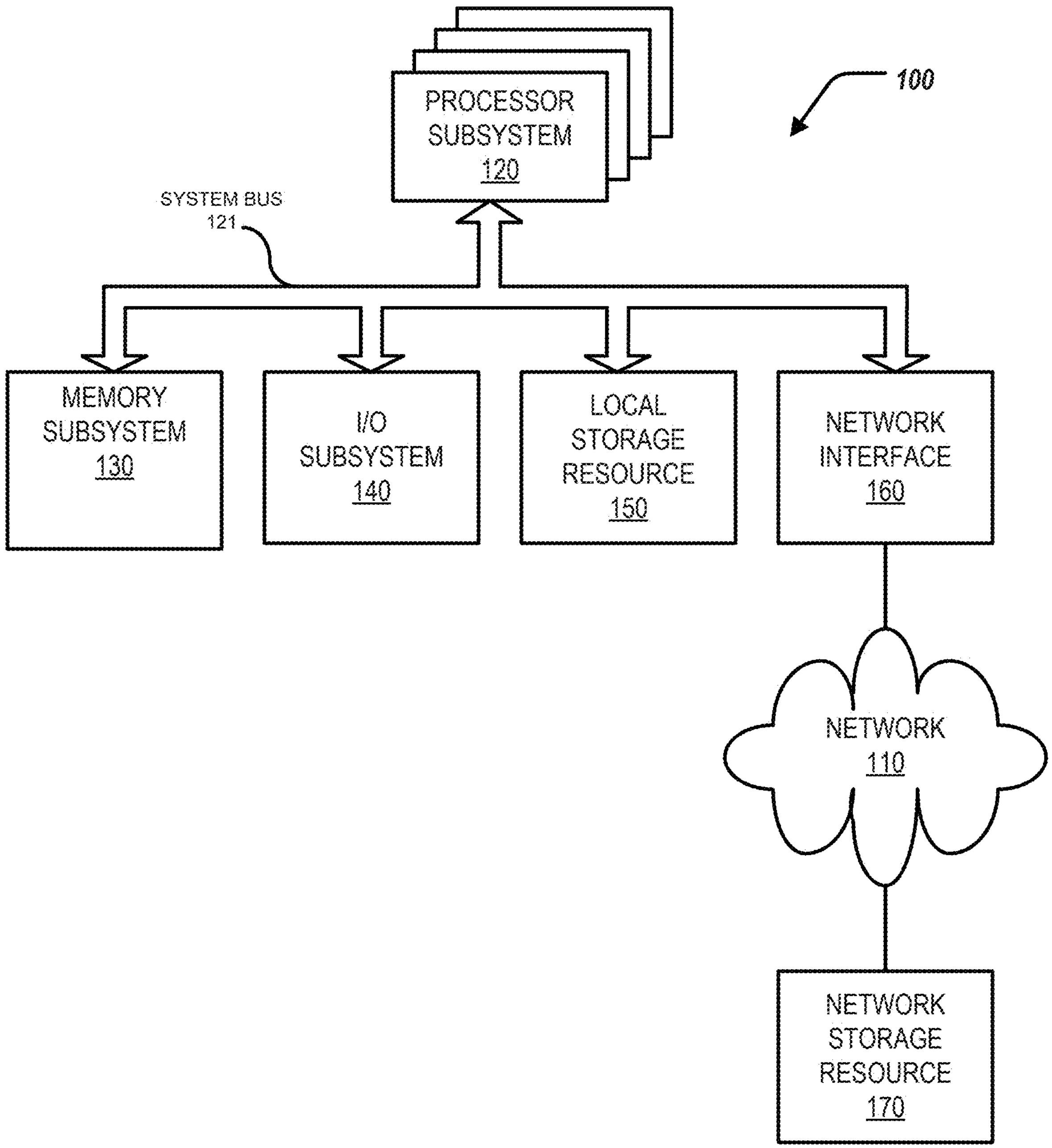
FIG. 1 is a block diagram of selected elements of an embodiment of an information handling system.

This disclosure discusses methods and systems for managing system crash event based diagnostics of an information handling system. In short, the present disclosure discusses detecting crash events at the information handling system and dynamically mapping diagnostics and remediations performed by the information handling system to address the crash event. This solution aims to tackle system crash events such as BSOD (Blue Screen of Death) crash events through a comprehensive diagnostic and remediation process performed by the information handling system. The approach monitors and records crash events as they occur and afterward. By analyzing the crash event data dumps, the root causes of these crash events are identified, and Indicators of Crash Events (IOCE) are generated (telemetry data). Using the telemetry data, a dynamic diagnostics profile is created and/or updated. Based on this diagnostic profile, specific remediation steps can occur, such as managing and updating drivers and firmware to address the root causes of the crash events, without user intervention. This solution improves system stability, reduces the frequency of crash events, enhances the ability to diagnose and address system crash events promptly, and proactively manages drivers and firmware to prevent future crash events, thereby increasing the operability and functioning of the information handling system.

Specifically, this disclosure discusses a system and a method for managing system crash event-based diagnostics of an information handling system, including detecting a crash event of an operating system (OS) of the information handling system; in response to detecting the crash event: capturing telemetry data of the information handling system related to the crash event, including a particular bug check code associated with the crash event; accessing a diagnostic profile associated with the crash event, the diagnostic profile including, for each bug check code of a plurality of bug check codes, one or more diagnostic tests associated with the bug check code; identifying, from the diagnostic profile, a mapping from the particular bug check code to a particular diagnostic test; automatically, executing the particular diagnostic test at a computing device of the information handling system that is associated with the particular bug check code; determining whether the diagnostic test was successful at the computing device; and determining that the diagnostic test failed at the computing device, and in response, performing, independent of user action, a corrective action at the computing device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Figure 2:
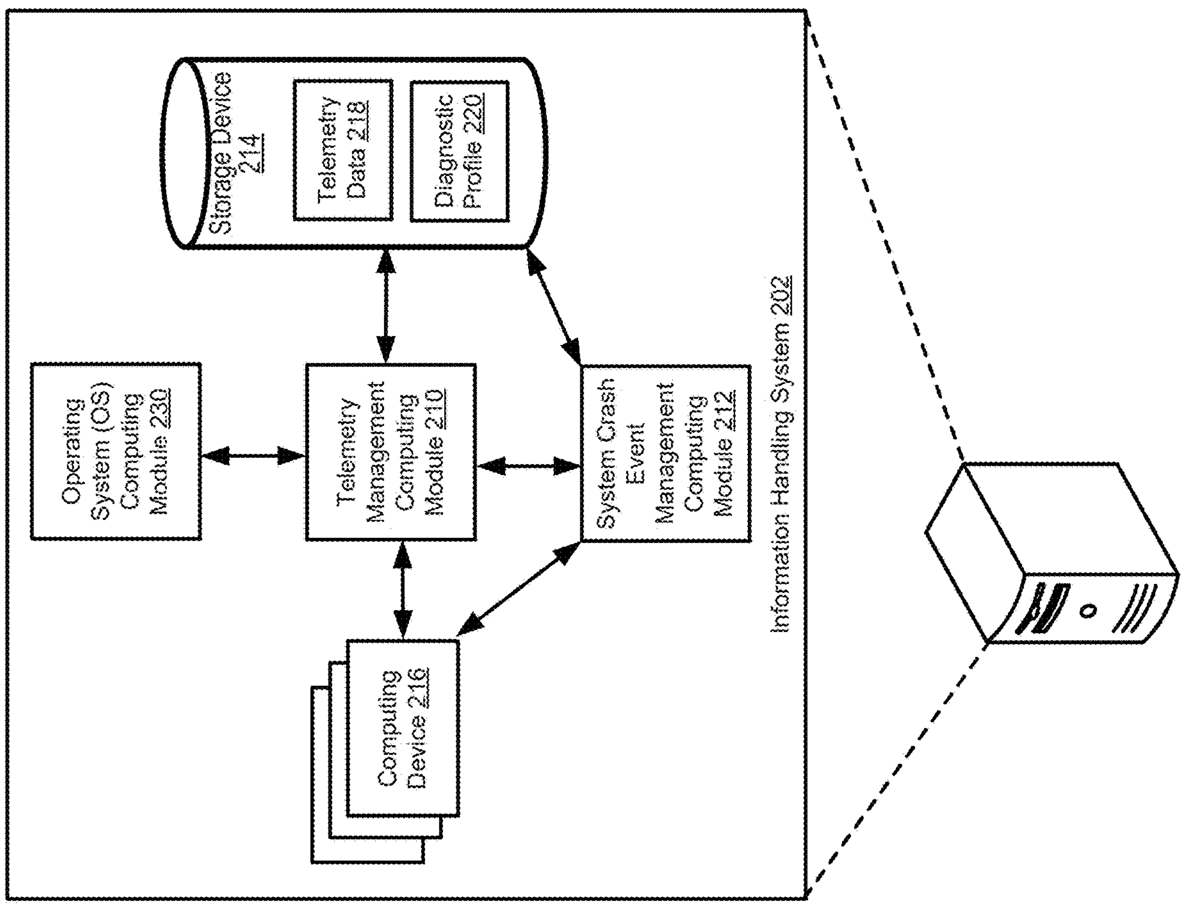
FIG. 2 illustrates a block diagram of an information handling system for managing system crash event based diagnostics.
Figure 3:
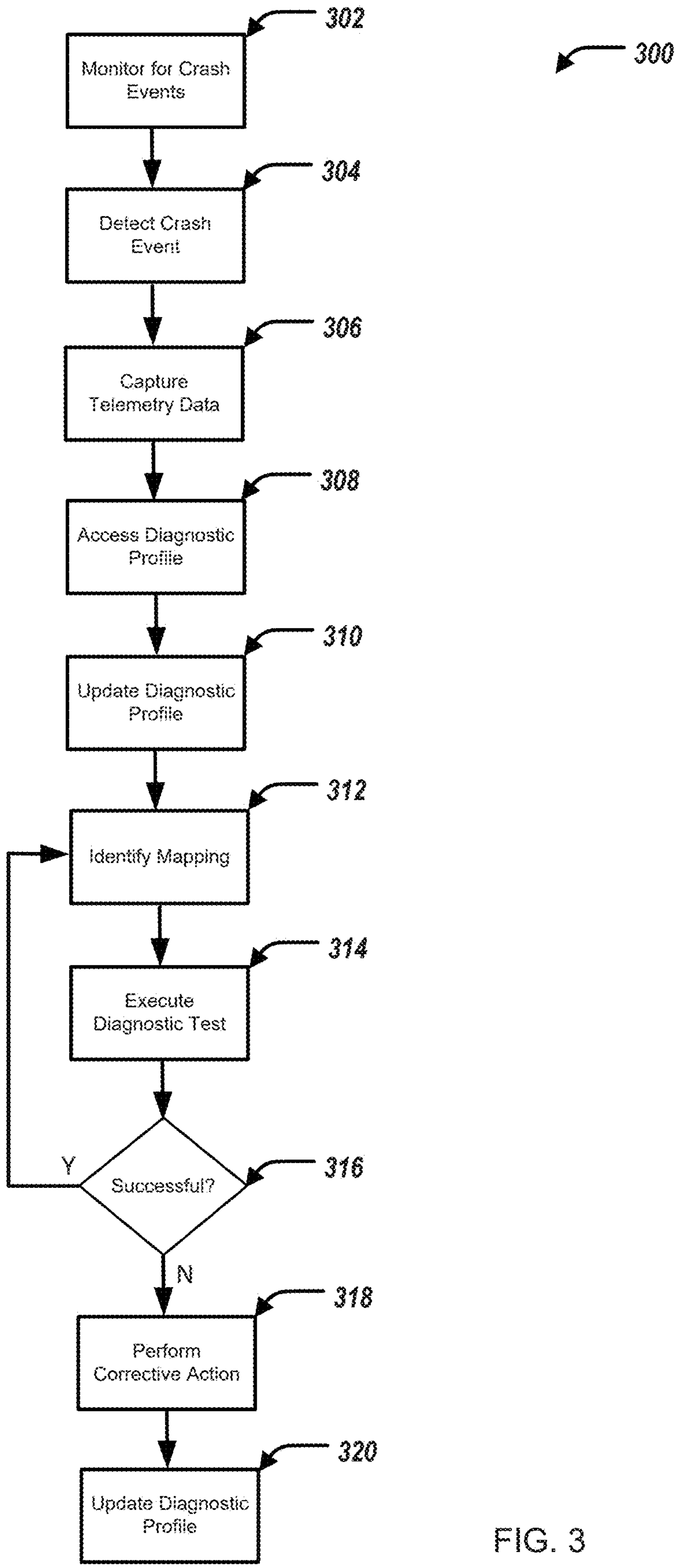
FIG. 3 illustrates a method for managing system crash event based diagnostics.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system 100). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning to FIG. 2, FIG. 2 illustrates an environment 200 including an information handling system 202. The information handling system 202 can include a telemetry management computing module 210, a system crash event management computing module 212, a storage device 214, computing devices 216, and an operating system (OS) computing module 230. In some examples, the information handling system 202 is similar to, or includes, the information handling system 100 of FIG. 1.

The telemetry management computing module 210 can be in communication with the computing devices 216, the system crash event management computing module 212, the OS computing module 230, and the storage device 214. The system crash event management computing module 212 is in communication with the telemetry management computing module 210, the computing devices 216, and the storage device 214.

The computing devices 216 can include memory, storage devices, video cards, audio cards, processors, and the like.

In some examples, the OS computing module 230 can include the OS of the information handling system 202, or be a representation of the OS of the information handling system 202. In some examples, the OS computing module 230 can indicate values of metrics or parameters of the OS of the information handling system 202. In some examples, the OS computing module 230 is the OS of the information handling system 202. In some examples, the OS computing module 230 can be in communication with the OS of the information handling system 202. In some examples, the OS computing module 230 can include data associated with the OS of the information handling system, like crash events of the OS and/or telemetry data of the OS such as crash event telemetry data.

In short, the present disclosure discusses detecting crash events at the information handling system 202 and dynamically mapping diagnostics and remediations to address the crash event. This solution aims to tackle system crash events such as BSOD (Blue Screen of Death) crash events through a comprehensive diagnostic and remediation process. The approach monitors and records crash events as they occur and afterward. By analyzing the crash event data dumps, the root causes of these crash events are identified, and Indicators of Crash Events (IOCE) are generated (telemetry data). Using the telemetry data, a dynamic diagnostics profile is created and/or updated. Based on this diagnostic profile, specific remediation steps can occur, such as managing and updating drivers and firmware to address the root causes of the crash events. This solution improves system stability, reduces the frequency of crash events, enhances the ability to diagnose and address system crash events promptly, and proactively manages drivers and firmware to prevent future crash events.

FIG. 3 illustrates a flowchart depicting selected elements of an embodiment of a method 300 for managing system crash event based diagnostics. The method 300 may be performed by the information handling system 100, the information handling system 202, the telemetry management computing module 210, and/or the system crash event management computing module 212, and with reference to FIGS. 1-2. It is noted that certain operations described in method 300 may be optional or may be rearranged in different embodiments.

The telemetry management computing module 210 monitors the information handling system 202 for crash events of an operating system (OS) of the information handling system, at 302. Specifically, the telemetry management computing module 210 monitors the information handling system 202 for a Blue Screen of Death (BSOD) crash event. In some examples, the telemetry management computing module 210 monitors crash events via the OS computing module 230. That is, the telemetry management computing module 210 communicates with the OS computing module 230 to monitor the crash events of the OS.

The telemetry management computing module 210 detects a crash event of the OS of the information handling system 202, at 304. That is, the telemetry management computing module 210 detects the crash event of the OS of the information handling system 202 via the OS computing module 230.

The telemetry management computing module 210, in response to detecting the crash event, captures telemetry data of the information handling system 202 related to the crash event, at 306. In particular, the telemetry management computing module 210 automatically captures telemetry data of the computing devices 216 related to the crash event. In some examples, the telemetry management computing module 210 captures telemetry data of the computing devices 216 including a particular bug check code associated with the crash event. The telemetry management computing module 210 can store the telemetry data 218 associated with the crash event at the storage device 214.

In some examples, the system crash event management computing module 212 can access the telemetry data 218 from the storage device 214, including the particular bug check code associated with the crash event. In some examples, the telemetry management computing module 210 provides a notification to the system crash event management computing module 212 noting the telemetry data 218, or an update to the telemetry data 218, including the particular bug check code associated with the crash event. In some examples, the system crash event management computing module 212 can access, or check, the storage device 214 for the telemetry data 218, or an update to the telemetry data 218, including the particular bug check code associated with the crash event, periodically (e.g., every 1 second, 1 minute). In some examples, the telemetry management computing module 210 provides the telemetry data 218, or updates to the telemetry data 218, the particular bug check code associated with the crash event, directly. In some examples, the system crash event management computing module 212 subscribes to alerts from the telemetry management computing module 210 regarding the crash event.

The system crash event management computing module 212 accesses a diagnostic profile 220 associated with the crash event, at 308. The system crash event management computing module 212 can access the diagnostic profile 220 in response to a signal from the telemetry management computing module 210, or periodically. The diagnostic profile 220, for each bug check code of a plurality of bug check codes, includes one or more diagnostic tests associated with the bug check code. That is, the diagnostic profile 220 stores data indicating bug check codes and the diagnostic tests associated with each bug check code. An example diagnostic profile 220 is shown below:

```
Diagnostic Profile :
{
  {
    PAGE_FAULT_IN_NONPAGED_AREA,
    idiag.memory.test.AdvancedTest
  }
  {
    VIDEO_TDR_TIMEOUT_DETECTED,
    idiag.video.test.functional
  }
  {
    FAULTY_HARDWARE_CORRUPTED_PAGE,
    idiag.memory.test.AdvancedTest
    idiag.stroage.test.shortDst
  }
}
```

The system crash event management computing module 212 updates the diagnostic profile 220 based on the telemetry data 218, at 310. That is, the system crash event management computing module 212 updates the diagnostic profile 220 to reflect the system crash event, and the telemetry data 218 associated with the crash event, including updating data associated with the bug check code of the crash event and the telemetry data 218 of the crash event.

The system crash event management computing module 212 identifies, from the diagnostic profile 220, a mapping from the particular bug check code to a particular diagnostic test, at 312. In some examples, the diagnostic test can be associated with the computing devices 216 associated with the system crash. In some examples, the diagnostic test is associated with other computing devices 216 that are associated with the computing devices 216 that are associated with the system crash. In some examples, the particular bug check code is mapped to multiple diagnostic tests. The system crash event management computing module 212 can identify the diagnostic test for the particular bug check code at a top of a queue of the diagnostic tests, or randomly.

The system crash event management computing module 212 automatically executes the particular diagnostic test at the computing device 216 that is associated with the particular bug check code, at 314. The diagnostic test can test features and/or performance parameters of the computing device 216 as they relate to the system crash event. The system crash event management computing module 212 can automatically execute the particular diagnostic test in response to detecting the crash event, and without user input/intervention. In some examples, the system crash event management computing module 212 executes the diagnostic test at the computing device 216 multiple times. In some examples, the system crash event management computing module 212 executes the diagnostic test at a plurality of the computing devices 216, concurrently or in a predetermined order.

The system crash event management computing module 212 determines whether the diagnostic test was successful at the computing device 216, at 316. In some examples, the system crash event management computing module 212 can determine whether the diagnostic test was successful at the computing device 216 by determining whether an issue at the computing device 216 resulted in, or led to, the crash event. For example, the system crash event management computing module 212 can execute the diagnostic test at the computing device 216 by testing parameters of the computing device 216, including functionality of i) the computing device 216 ii) firmware of the computing device 216 iii) a driver of the computing device 216 and iv) a configuration of the computing device 216. That is, the diagnostic test can test the computing device 216, the firmware of the computing device 216, the driver of the computing device 216, and/or the configuration of the computing device 216 to determine the functionality of each and whether each is functioning properly and as intended.

In some examples, the system crash event management computing module 212 can determine that the diagnostic test failed at the computing device 216 (at 316), and in response, perform, independent of user input/interaction by the user 250, a corrective action at the computing device 216, at 318. That is, the system crash event management computing module 212 performs remediation at the computing device 216 based on the diagnostic test failing at the computing device 216. The system crash event management computing module 212 performs the remediation action at the information handling system 202 (and specifically, at the computing devices 216) automatically in response to determining that the remediation action is to be performed and without user interaction/input. The system crash event management computing module 212 can perform the remediation action (or remediation actions) to decrease the odds/likelihood of crash events of the information handling system 202 by improving computational capabilities of the information handling system 202 (such as the computing devices 216). That is, performing the remediation action(s) to the computing devices 216 by the system crash event management computing module 212 improves the computational/performance capabilities of the information handling system 202 (the computing devices 216) such that the likelihood of crash events of the information handling system 202 is decreased. In some examples, the system crash event management computing module 212 can perform the remediation action (or remediation actions) to decrease the odds/likelihood of crash events of the information handling system 202 without user action/input by the user 250 (independent of user action/input by the user 250).

In some examples, the system crash event management computing module 212, in response to the diagnostic failing at the computing device 216, can perform the corrective action of uninstalling a driver associated with the computing device 216 without input/interaction by the user 250. That is, the system crash event management computing module 212 can uninstall, or facilitate uninstallation, of the driver at the computing device 216 automatically in response to determining that the diagnostic test failed at the computing device 216.

In some examples, the system crash event management computing module 212, in response to the diagnostic failing at the computing device 216, can perform the corrective action of updating a driver associated with the computing device 216 without input/interaction by the user 250. That is, the system crash event management computing module 212 can update, or facilitate updating, of the driver at the computing device 216 automatically in response to determining that the diagnostic test failed at the computing device 216.

In some examples, the system crash event management computing module 212, in response to the diagnostic failing at the computing device 216, can perform the corrective action of disabling a driver associated with the computing device 216 without input/interaction by the user 250. That is, the system crash event management computing module 212 can disable, or facilitate disabling, the driver at the computing device 216 automatically in response to determining that the diagnostic test failed at the computing device 216.

In some examples, the system crash event management computing module 212, in response to the diagnostic failing at the computing device 216, can perform the corrective action of updating firmware associated with the computing device 216 without input/interaction by the user 250. That is, the system crash event management computing module 212 can update, or facilitate updating, the firmware at the computing device 216 automatically in response to determining that the diagnostic test failed at the computing device 216.

In some examples, the system crash event management computing module 212, in response to the diagnostic failing at the computing device 216, can perform the corrective action of updating a configuration associated with the computing device 216 without input/interaction by the user 250. That is, the system crash event management computing module 212 can update, or facilitate updating, the configuration of the computing device 216 automatically in response to determining that the diagnostic test failed at the computing device 216.

The system crash event management computing module 212 updates the diagnostic profile 220, at 320. That is, the system crash event management computing module 212 updates the diagnostic profile 220 to reflect the performance of the corrective action at the computing device 216. That is, the system crash event management computing module 212 updates the diagnostic profile 220 to indicate that for the crash event and the telemetry data associated with the crash event, the corrective action performed at the computing device 216 and the computing device 216 that the corrective action was performed at. In some examples, the system crash event management computing module 212 updates the diagnostic profile 220 to indicate the current status of the computing device 216, including the configuration of the computing device 216, the firmware (version) of the computing device 216, and/or the driver (version) of the computing device 216 in response to the corrective action performed at the computing device 216.

In some examples, the system crash event management computing module 212 can determine that the diagnostic passed at the computing device 216 (at 316), and in response, return to step 312. In particular, the system crash event management computing module 212 identifies, from the diagnostic profile 220, a further mapping from the particular bug check code to a further diagnostic test, at 312. The system crash event management computing module 212 executes the further diagnostic test at the computing device 216 that is associated with the particular bug check code, at 314. The system crash event management computing module 212 determines whether the further diagnostic test was successful at the computing device 216, at 316.

The method 300 can be performed at any of the computing devices 216 and any number of the computing device 216.

In a use case, the information handling system 202 can experience frequency BSOD crash events with a bug check code of "PAGE_FAULT_IN_NONPAGED AREA." This can occur when the information handling system 202 attempts to access a page of memory (computing device 216) that is not present. The system crash event management computing module 212 can execute a diagnostic test at the memory that can determine a source of the BSOD crash event, and a corrective action to be performed. Thus, future crash events are mitigated, improving the functionality of the information handling system 202.

In a use case, the information handling system 202 experiences frequency BSOD crash events with a bug check code of "VIDEO_TDR_TIMEOUT_DETECTED." This can occur when the display driver of a computing device 216 fails to respond within an allocated time. The system crash event management computing module 212 can execute a diagnostic test at a graphical processing unit (GPU) including a quick video diagnostic to determine a source of the BSOD crash event, and a corrective action to be performed. Thus, future crash events are mitigated, improving the functionality of the information handling system 202.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of managing system crash event-based diagnostics of an information handling system, including:

detecting a crash event of an operating system (OS) of the information handling system;

in response to detecting the crash event:

capturing telemetry data of a first computing device of the information handling system related to the crash event, including a particular bug check code associated with the crash event;

accessing a diagnostic profile associated with the crash event, the diagnostic profile including, for each bug check code of a plurality of bug check codes, one or more diagnostic tests associated with the bug check code;

identifying, from the diagnostic profile, a mapping from the particular bug check code to a particular diagnostic test, the particular diagnostic test associated with a second computing device differing from the first computing device;

automatically executing the particular diagnostic test at the second computing device of the information handling system that is associated with the particular bug check code;

determining whether the diagnostic test was successful at the second computing device; and determining that the diagnostic test failed at the second computing device, and in response, performing, independent of user action, a corrective action at the second computing device.

2. The computer-implemented method of claim 1, further including:

determining that the diagnostic test failed at the second computing device, and in response, performing the corrective action at the second computing device and updating the diagnostic profile to indicate such.

3. The computer-implemented method of claim 1, further including:

updating the diagnostic profile based on the telemetry data.

4. The computer-implemented method of claim 1, further including:

monitoring the information handling system for the crash event of the OS of the information handling system.

5. The computer-implemented method of claim 1, wherein the crash event is a Blue Screen of Death (BSOD) crash event.

6. The computer-implemented method of claim 1, wherein the corrective action includes uninstalling a driver associated with the second computing device at the information handling system.

7. The computer-implemented method of claim 1, wherein the corrective action includes updating a driver associated with the second computing device at the information handling system.

8. The computer-implemented method of claim 1, wherein the corrective action includes disabling a driver associated with the second computing device at the information handling system.

9. The computer-implemented method of claim 1, wherein the corrective action includes updating firmware associated with the second computing device at the information handling system.

10. The computer-implemented method of claim 1, wherein the corrective action includes updating a configuration associated with the second computing device at the information handling system.

11. The computer-implemented method of claim 1, further including:

determining that the diagnostic test passed at the second computing device, and in response:

identifying, from the diagnostic profile, a further mapping from the particular bug check code to a further diagnostic test;

executing the further diagnostic test at the second computing device of the information handling system that is associated with the particular bug check code; and determining whether the further diagnostic test was successful at the second computing device.

12. An information handling system comprising a processor having access to memory media storing instructions executable by the processor to perform operations, comprising:

detecting a crash event of an operating system (OS) of the information handling system;

in response to detecting the crash event:

capturing telemetry data of a first computing device of the information handling system related to the crash event, including a particular bug check code associated with the crash event;

accessing a diagnostic profile associated with the crash event, the diagnostic profile including, for each bug check code of a plurality of bug check codes, one or more diagnostic tests associated with the bug check code;

identifying, from the diagnostic profile, a mapping from the particular bug check code to a particular diagnostic test, the particular diagnostic test associated with a second computing device differing from the first computing device;

automatically executing the particular diagnostic test at the second computing device of the information handling system that is associated with the particular bug check code;

determining whether the diagnostic test was successful at the second computing device; and determining that the diagnostic test failed at the second computing device, and in response, performing, independent of user action, a corrective action at the second computing device.

13. The information handling system of claim 12, the operations further including:

determining that the diagnostic test failed at the second computing device, and in response, performing the corrective action at the second computing device and updating the diagnostic profile to indicate such.

14. The information handling system of claim 12, the operations further including:

updating the diagnostic profile based on the telemetry data.

15. The information handling system of claim 12, the operations further including:

monitoring the information handling system for the crash event of the OS of the information handling system.

16. The information handling system of claim 12, wherein the crash event is a Blue Screen of Death (BSOD) crash event.

17. The information handling system of claim 12, wherein the corrective action includes uninstalling a driver associated with the second computing device at the information handling system.

18. The information handling system of claim 12, wherein the corrective action includes updating a driver associated with the second computing device at the information handling system.

19. The information handling system of claim 12, wherein the corrective action includes disabling a driver associated with the second computing device at the information handling system.

20. A non-transitory computer-readable medium storing software comprising instructions executable by one or more computers which, upon such execution, cause the one or more computers to perform operations comprising:

detecting a crash event of an operating system (OS) of the information handling system;

in response to detecting the crash event:

capturing telemetry data of a first computing device of an information handling system related to the crash event, including a particular bug check code associated with the crash event;

accessing a diagnostic profile associated with the crash event, the diagnostic profile including, for each bug check code of a plurality of bug check codes, one or more diagnostic tests associated with the bug check code;

identifying, from the diagnostic profile, a mapping from the particular bug check code to a particular diagnostic test, the particular diagnostic test associated with a second computing device differing from the first computing device;

automatically executing the particular diagnostic test at the second computing device of the information handling system that is associated with the particular bug check code;

determining whether the diagnostic test was successful at the second computing device; and determining that the diagnostic test failed at the second computing device, and in response, performing, independent of user action, a corrective action at the second computing device.

* * * * *